I. LINDSLEY.
Stone Dressing Machine.

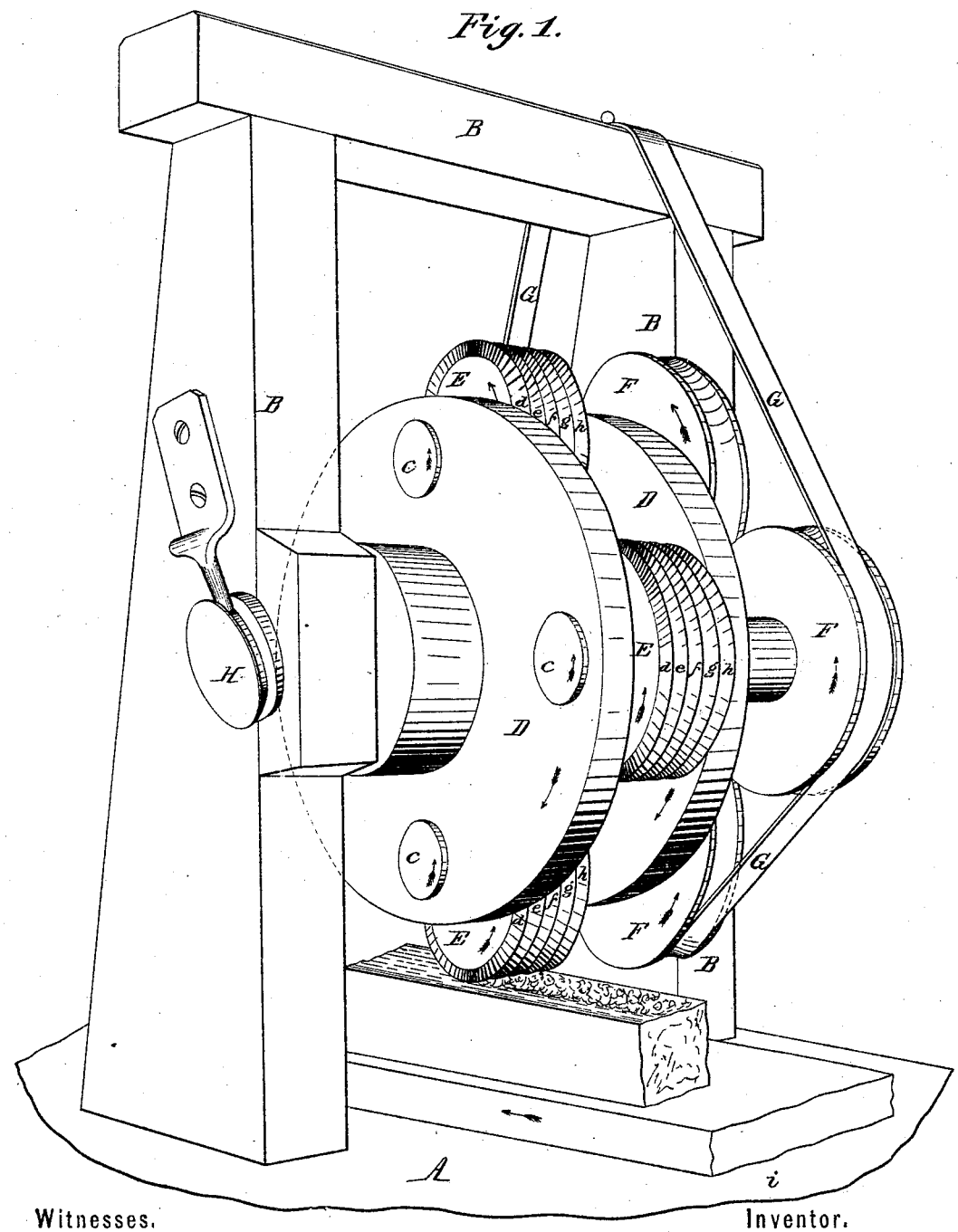

No. 124,002.        Patented Feb. 27, 1872.

Witnesses.            Inventor.
George H. Stanley      Isaac Lindsley
Thomas P. Barnefield 3 Sheets--Sheet 3.
I. LINDSLEY.
Stone Dressing Machine.
No. 124,002.                 Patented Feb. 27, 1872.
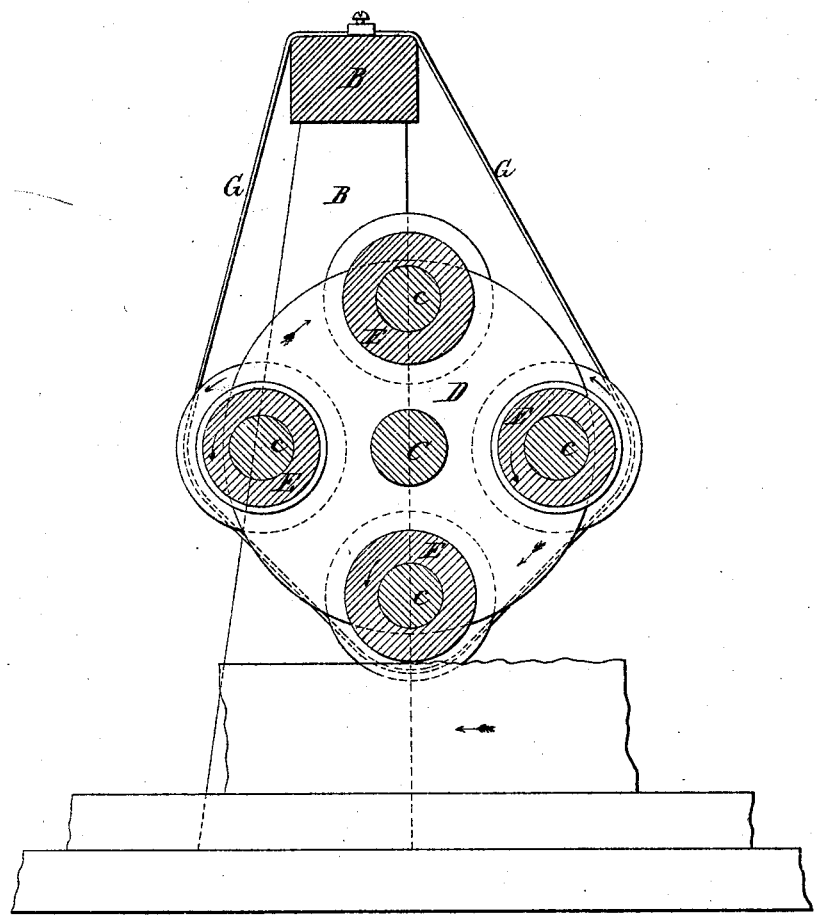
Fig. 4.
Fig. 5.
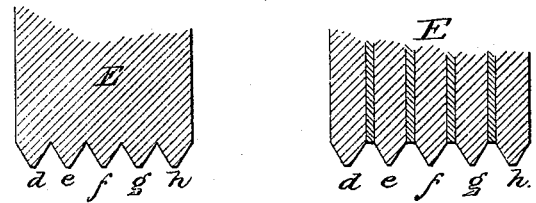
Witnesses.                 Inventor.
George H. Stanley.          Isaac Lindsley.
Thomas P. Barnefield.

124,002

UNITED STATES PATENT OFFICE.

ISAAC LINDSLEY, OF PAWTUCKET, RHODE ISLAND.

IMPROVEMENT IN STONE-DRESSING MACHINES.

Specification forming part of Letters Patent No. 124,002, dated February 27, 1872.

I, ISAAC LINDSLEY, of the village of Pawtucket, in the town of North Providence, county of Providence and State of Rhode Island, have invented certain Improvements in Stone-Dressing Machines, of which the following is a specification:

My said invention relates to a circular head having rotary cutters mounted therein, and the combination of these rotary cutters with band-pulleys and a stationary belt or band, in such a manner that, while the circular head containing the said rotary cutters has a rapid forward motion, the said rotary cutters have an equally rapid reverse motion previous to and during their contact with the stone; my object being to rapidly reduce granite and other stone to a smooth and even surface with comparatively little or no injury to the cutters.

Description of Drawing.

Figure 1 is a perspective view of the completed machine in operation, showing block of granite being dressed. Fig. 4 is a vertical transverse section, giving a sectional view of all the main parts of my said machine, and the manner of their operation. Fig. 5 is a detached sectional view of the rotary cutters as made of a solid block of hardened steel, or of separate disks thereof.

Figure 3:
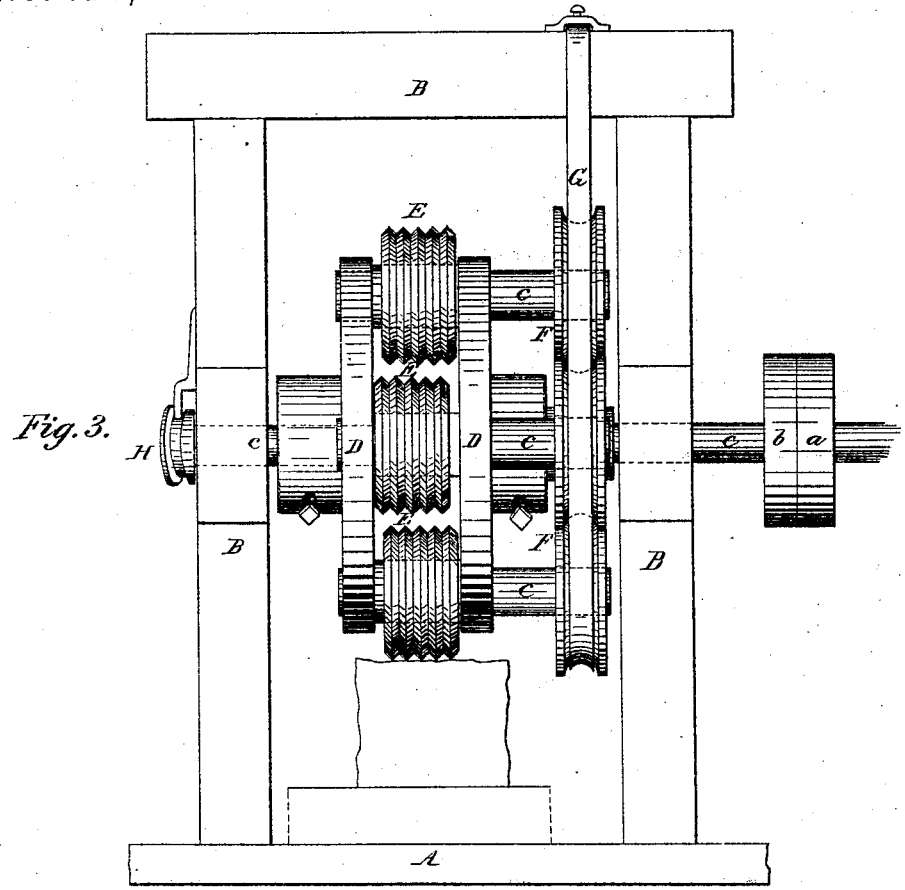
Fig. 3 is an elevation of the same, showing the combination of rotary cutters and band-pulleys with the stationary belt or band, and the manner of the action of the cutters upon the stone.
Figure 2:
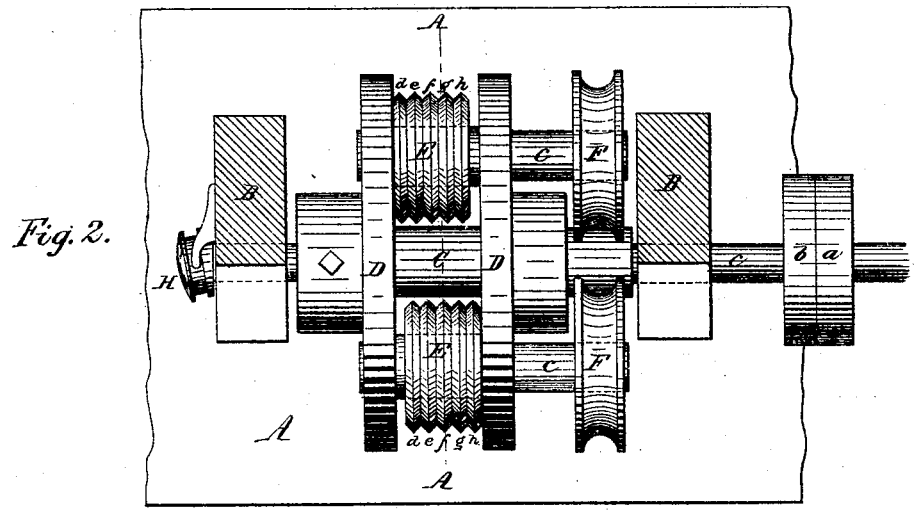
Fig. 2 is a plan of the machine, showing the construction of the rotary cutters and band-pulleys and method of their combination; also showing main shaft, cam, tight and loose pulleys, and portion of the frame.

General Description.

A is the bed of the machine, and B is the frame, both to be substantially constructed and of solid materials, in order to resist the vibrations of the operating parts. C is the main or driving shaft, with tight and loose pulleys *a b*. This shaft is to be hung in movable bearings, by which it may be elevated or depressed, and is also to have a crosswise adjustment in the line of its said bearings, that the cutting of the machine upon the stone may be accurately governed by the operator. D D form the circular head, having the rotary cutters (hereinafter described) mounted therein. The driving-shaft C passes through the center of this circular head, communicating motion to the said head D D, and through the latter to the rotary cutters aforesaid, and these, by means of the band-pulleys and stationary belt or band hereinafter described, are made to revolve rapidly in a direction opposite to that of the said circular head D D. E E E E are the rotary cutters, hung on bearings in the periphery of the said circular head D D, and having their shafts *c c c c* elongated to the right in order to connect them with their respective band-pulleys, hereinafter described. These rotary cutters may be made in a variety of ways. They may be made of solid blocks of hardened steel, having a perforation through their center to accommodate them to their shafts *c c c c*. In this case, their edge or circumference is to be grooved or furrowed to form the cutting-edges *d e f g h*. These cutting-edges may be, say, one-fourth of an inch thick, more or less, at their base, and, say, one-fourth of an inch high, more or less, from the bottom of the said grooves or furrows, and having each of its sides beveled to a stunted edge; said cutters being made short and thick at their base, in order to resist the action of the stone upon them when the machine is being operated. The said rotary cutters may also be made of separate disks of hardened steel, securely clamped together, each disk having the proper hole through its center to accommodate it to the shaft *c*, to be of the diameter desired for the entire rotary cutter when completed, and each separate disk having its circumference evenly beveled to an edge in the same manner, for the purpose and with the same result substantially as when the rotary cutter is made of a single block of hardened steel, as before described. There would then be as many of these separate disks in each of the rotary cutters as there are of the cutting-edges *d e f g h*, each disk furnishing one cutting-edge. Or these disks may be so made as to have or contain two cutting-edges, or even more, substantially as and for the purposes hereinbefore described. Of these said rotary cutters E E E E, there may be four, or six, or twelve, or any given number fixed in the periphery of the said circular head D D, the number to be proportioned, of course, to the size and strength of the said circular head; and in the edge or circumference of the said rotary cutters E E E E, (made in either of the ways hereinbefore described, or otherwise,) there may be five, or eight, or any given number of cutting-edges, proportioned, of course, to the width of the edges of said rotary cutters, and also proportioned to the fineness or coarseness of the work desired to be done. Each of the rotary cutters aforesaid are so placed in the circular head D D that its cutting-edges $d\ e\ f\ g\ h$ do not accurately follow those of the next preceding rotary cutter; but they cut onto the ridges left by the preceding rotary cutter in such a manner that a complete revolution of the said circular head D D leaves a smooth and unfurrowed surface on the stone. F F F F are band-pulleys, each connected with its respective rotary cutter, as aforesaid, by means of the elongated shaft $c$. The edge or circumference of each band-pulley is deeply grooved, said groove covering, say, three-fourths of the width of the said edge, and by means thereof the stationary belt or band heretofore referred to is kept in place. G is a stationary belt or band, fastened to the right of the top of the frame B, passing over the sides of the band-pulleys F F F F, and underneath either of said band-pulleys that may happen to be at the bottom. Now, when the circular head D D is revolved by means of power applied to the driving-pulley $b$ on the main shaft C, each of the rotary cutters E E E E is carried over until its respective band-pulley is brought against the said stationary belt or band G, and by the operation of said stationary belt G each of said rotary cutters is made to revolve in a direction counter to that of the circular head D D, and upon its own shaft $c$. By this combination of rotary cutters, band-pulleys, and stationary belt, (so combined and constructed as aforesaid, or in any manner that would be a substantial equivalent thereof,) and by the peculiar reverse or counter motion that is communicated to the said rotary cutters previous to and during their contact with the stone, the cutting-edges $d\ e\ f\ g\ h$ are effectually saved the destructive friction that has hitherto attended the use of stationary cutters for hewing and dressing stone, however they may have been constructed, applied, or operated. H is a cam, attached to the main shaft C at the end opposite that having the tight and loose pulleys $a\ b$, and is for the purpose of giving to the entire circular head D D a slight motion laterally, in order to prevent any inclination of the rotary cutters to leave a furrowed surface on the stone.

My said "stone-dressing machine" is to be provided with a feed-carriage similar to that used in iron-planers for similar purposes, connected with which will be a proper feed-motion to and fro, with a lateral feed if it should be found necessary or desirable.

The stone to be hewed or dressed is introduced along the bed A from the end $i$, and is immediately passed under the rotary cutters E E E E while they are revolving with a velocity, say, of one thousand times per minute, more or less. The surface of the stone is hewn or dressed, not so much by any cutting operation of the cutters $d\ e\ f\ g\ h$ themselves, strictly speaking, as by their sharp and quick concussion upon the stone; and, by reason of the rapid motion of the said rotary cutters E E E E in a direction opposite to that in which they strike the stone, the destructive friction aforesaid is obviated, and the granite or other stone is smoothly, evenly, and rapidly reduced to the desired surface, with comparatively little or no injury to the rotary cutters and cutting-edges aforesaid.

Claims.

I claim as my invention—

1. The rotary cutters, constructed in the circular head, substantially as described, and for the purposes set forth.

2. The combination of the rotary cutters, the band-pulleys, and the stationary belt or band, substantially as described, whereby the peculiar rapid reverse motion is given to the rotary cutters while revolving at a high velocity, and during their contact with the stone.

3. The combination of the means H, substantially as described, with the head D D, whereby a lateral motion is imparted to the entire head, for the purposes set forth.

4. The mode of operating the rotary cutters in the circular head upon the stone, substantially as described, and for the purposes set forth.

ISAAC LINDSLEY.

Witnesses:
 GEO. H. STANLEY,
 THOMAS P. BARNEFIELD.